(12) United States Patent
Bennett

(10) Patent No.: US 8,998,129 B2
(45) Date of Patent: Apr. 7, 2015

(54) LANDING GEAR

(75) Inventor: Ian Bennett, Gloucestershire (GB)

(73) Assignee: Messier-Dowty Limited (GB)

( * ) Notice: Subject to any disclaimer, the term of this patent is extended or adjusted under 35 U.S.C. 154(b) by 199 days.

(21) Appl. No.: 13/574,357

(22) PCT Filed: Jan. 19, 2011

(86) PCT No.: PCT/GB2011/050086
§ 371 (c)(1),
(2), (4) Date: Jul. 20, 2012

(87) PCT Pub. No.: WO2011/089426
PCT Pub. Date: Jul. 28, 2011

(65) Prior Publication Data
US 2012/0318909 A1    Dec. 20, 2012

(30) Foreign Application Priority Data

Jan. 22, 2010    (GB) .................................. 1001042.9

(51) Int. Cl.
*B64C 25/50*    (2006.01)
*B64C 25/34*    (2006.01)

(52) U.S. Cl.
CPC ........... *B64C 25/34* (2013.01); *B64C 2025/345* (2013.01)

(58) Field of Classification Search
CPC .......................... B64C 25/50; B64C 2025/345
USPC .......................................... 244/50, 51, 100 R
See application file for complete search history.

(56) References Cited

U.S. PATENT DOCUMENTS

| 2,544,278 | A | * | 3/1951 | Nickell ........................... 244/50 |
| 5,207,398 | A | | 5/1993 | Veauz et al. |
| 5,242,131 | A | | 9/1993 | Watts |
| 5,595,359 | A | | 1/1997 | Meneghetti |

(Continued)

FOREIGN PATENT DOCUMENTS

| EP | 0488871 | 6/1992 |
| EP | 0713826 | 5/1996 |

(Continued)

OTHER PUBLICATIONS

Podratzky, Andrea, Authorized Officer of the EPO, International Search Report for PCT/GB2011/050086, Jun. 27, 2011.

(Continued)

*Primary Examiner* — Philip J Bonzell
*Assistant Examiner* — Nicholas McFall
(74) *Attorney, Agent, or Firm* — RatnerPrestia

(57) ABSTRACT

Aircraft landing gear including an axle pivotally connected to a bogie beam and a locking device. The locking couples the axle to the bogie beam, and has a movable member and a follower. The movable member is movable between first and second configurations. Movement of the movable member towards the second configuration causes corresponding movement of the follower so as to transfer a steering force to the axle through the follower which causes the axle to rotate in a first direction. With the movable member in the first configuration, the follower is in a first configuration that inhibits the movable member being moved by an external force applied to the axle. With the movable member in the second configuration, the follower in a second configuration that permits the movable member to be moved by an external force applied to the axle.

22 Claims, 9 Drawing Sheets

(56) References Cited

U.S. PATENT DOCUMENTS

| | | |
|---|---|---|
| 5,860,667 A | 1/1999 | Andre |
| 2,943,820 A1 | 2/2002 | Westcott, Jr. |

FOREIGN PATENT DOCUMENTS

| | | |
|---|---|---|
| FR | 2802892 | 6/2001 |
| FR | 2812613 | 2/2002 |
| JP | H 04266596 | 9/1992 |
| WO | WO 2006/071262 | 7/2006 |

OTHER PUBLICATIONS

Search report for International Application No. GB1001042.9 dated May 19, 2010.
Japanese Office Action, with English translation, for Japanese Patent Application No. P2012-549420 dated May 20, 2014.
Office Action with English translation for CN201180006270.8 dated May 28, 2014.

* cited by examiner

LANDING GEAR

CROSS REFERENCE TO RELATED APPLICATIONS

This application is a U.S. National Phase application of PCT International Application No. PCT/GB2011/050086, filed Jan. 19, 2011, which claims the benefit of GB1001042.9, filed Jan. 22, 2010.

BACKGROUND OF THE INVENTION

Large aircraft are often provided with a number of multi-axle landing gear. For example, such a landing gear may comprise a bogie beam carrying three axles, each axle carrying a plurality of wheels. It is common for one of the axles, generally the rear axle, to be steerable so as to reduce tyre wear when the aircraft is taxiing. The steerable axle is generally pivotally connected to the bogie beam. An actuator provided between the bogie beam and the steerable axle can control the orientation of the axle relative to the bogie beam.

As will be appreciated, there are instances where it is desirable for a steerable axle of a landing gear to be locked in a predetermined orientation. For example, during take-off and landing it is desirable that the steerable axle is locked in an orientation which is generally orthogonal with respect to the bogie beam and parallel with respect to the other axles on the bogie beam. Such landing gears are therefore provided with a locking device for locking the orientation of the steerable axle relative to the bogie beam.

A known way of providing a locking device is to provide a locking actuator. For example, the steering actuator may be configured to lock when it is at a predefined extension state, corresponding to the extension state required to provide the desired locking orientation of the axle.

A further known locking device is to provide a slot extending into the steerable axle in a manner substantially orthogonal with respect to the longitudinal axis of the axle. A wedge may be provided that is movable between a first position where the wedge is housed within the slot, so as to prevent the steerable axle pivoting about the bogie, and a second position where the wedge is removed from the slot, to allow the axle to pivot.

Both the above-mentioned types of locking device suffer from a disadvantage in that locking elements must move into mating recesses in order for the locks to function, and move out again in order to release the locks. Such operation may be at risk of jamming, and may create noise in operation.

BRIEF SUMMARY OF THE INVENTION

In accordance with a first aspect of the present invention, there is provided a landing gear for an aircraft, the landing gear including an axle pivotally connected to a bogie beam and a locking device, the locking device being arranged to couple the axle to the bogie beam, the locking device including a movable member and a follower, the movable member being arranged to be moved by an actuator between first and second configurations, the locking device being arranged such that movement of the movable member from the first configuration to the second configuration causes corresponding movement of the follower so as to transfer a steering force to the axle, through the follower, which causes the axle to rotate in a first direction, wherein, with the movable member in the first configuration, the locking device is arranged with the follower in a locking configuration that inhibits the movable member being back-driven by an external force applied to the axle and, with the movable member in the second configuration, the locking device is arranged with the follower in a passive configuration that permits the movable member to be back-driven by an external force applied to the axle.

Thus, the landing gear according to this aspect of the present invention has a locking device coupling the axle to the bogie beam. Movement of the movable member of the locking device causes the follower to move, which in turn steers the axle. With the movable member in the first configuration the locking device is arranged to lock the axle. This arrangement means that movement of the movable member can both steer the axle and change it from a locked to an unlocked configuration.

The movable member may be arranged to be moved to and from a third configuration, wherein, with the movable member in the third configuration, the locking device is arranged with the follower in a third configuration that permits the movable member to be moved by an external force applied to the axle. Moving the movable member towards the third configuration may cause corresponding movement of the follower, so as to transfer a steering force to the axle through the follower which causes the axle to rotate in a second direction.

Thus, in some embodiments the axle can be steered in both directions by way of movement of the movable member.

The movable member may enter the first configuration when passing between the second and third configurations.

The movable member may generally define a support plane for supporting the follower and with the movable member in the first configuration, a force applied to the movable member through the follower, due to the external force applied to the axle, is generally normal with respect to the support plane defined by the movable member.

The follower may be connected to the axle via a linkage that is either rigidly or pivotally connected to the axle.

The movable member may be pivotally mounted with respect to the bogie beam.

The movable member may define a cam surface and the locking device is arranged such that the follower is a cam follower that follows the cam surface in accordance with movement of the movable member. The cam surface may be defined by a slot formed through the movable member, within which the cam follower is located.

Thus, in some embodiments, the fact that the cam surface is defined by a slot formed through the movable member means that there are in effect two, opposing, cam surfaces for providing locking and drive in for both steering directions of the axle. The slot may also be configured to prevent the cam follower moving away from the cam surface.

The movable member and follower may form part of a gear arrangement, arranged such that the locus of the follower follows a trochoidal path.

The landing gear may include an actuator arranged to move the movable member. The actuator may be connected between the movable member and the axle. This may provide mechanical advantage.

The landing gear may further include a movable member biasing device arranged to bias the movable member towards the first configuration.

Thus, in such an embodiment, the movable member is biased towards its locking configuration i.e. the cam follower being positioned at or within the locking region of the cam surface. This can assist an actuator arranged to steer the axle or an actuator arranged to move the movable member to move the axle to the desired locking orientation.

In accordance with a second aspect of the present invention, there is provided a landing gear for an aircraft, the landing gear including an axle pivotally connected to a bogie beam, a locking member and a cam follower, one of the locking member and cam follower being coupled to the axle and the other being coupled to the bogie beam, wherein the locking member includes a cam surface and the cam follower is arranged to follow the cam surface, the cam surface including a locking region arranged such that the axle is maintained in a generally fixed orientation with respect to the bogie beam when the cam follower is at the locking region of the cam surface.

As appropriate, the preferred features described above are equally applicable to the landing gear according to the second aspect of the present invention.

In accordance with a third aspect of the present invention, there is provided a landing gear for an aircraft, the landing gear including an axle pivotally connected to a bogie beam and a locking device, the locking device including a mechanism arranged to move a follower along a trochoidal path, the mechanism being arranged such that the trochoidal path includes a locking region, wherein the axle is maintained in a generally fixed orientation with respect to the bogie beam when the follower is at the locking region of the trochoidal path.

As appropriate, the preferred features described above are equally applicable to the landing gear according to the third aspect of the present invention.

DESCRIPTION OF THE DRAWINGS

Embodiments of the present invention will now be described, by way of example only, with reference to the accompanying figures, in which.

DETAILED DESCRIPTION OF EMBODIMENTS OF THE INVENTION

Figure 1:
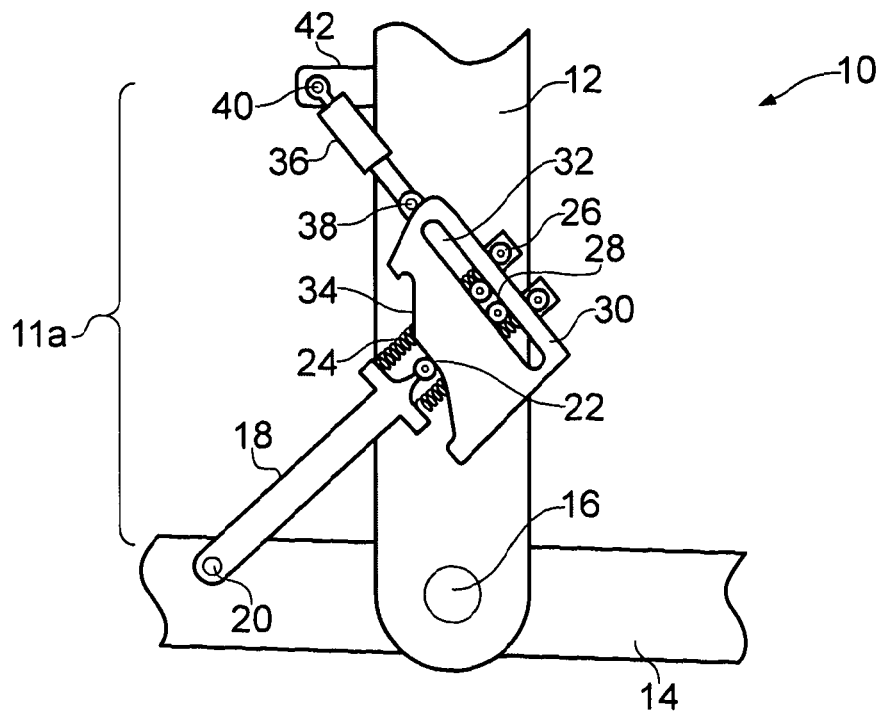
FIG. 1 shows a plan view of part of a landing gear according to an embodiment of the present invention, with the rear axle orientated in the desired locking configuration and the cam follower of the linkage being within the locking region of the cam surface.

Referring to FIG. 1, a partial plan view of a landing gear 10 is shown according to an embodiment of the present invention. The landing gear 10 includes an elongate bogie beam 12 which is pivotally connected to an axle 14 at pivot point 16. The axle 14 in the illustrated example is the rear axle and is steerable. The landing gear 10 includes a locking device 11a provided between the bogie beam 12 and axle 14, so as to provide a coupling between them. The coupling is such that the locking device 11a, under normal circumstances, is always capable of steering the axle but is operable to be put into a configuration where the axle is locked such that the locking device 11a inhibits an external force applied to the axle 14 from moving it. The locking device 11a in this embodiment generally includes a movable member 30 mounted on the bogie beam 12 and arranged to move relative to a follower 22 that is linked to the axle 14.

The movable member 30 is moveably mounted with respect to the bogie beam 12. In this embodiment, the movable member 30 is mounted such that it may move linearly with respect to the bogie beam 12. The movable member 30 is generally plate-like and includes an elongate slot 32 within which a pair of mounting pins 28 reside. The mounting pins 28 are fixed to the bogie beam and are spaced from one another such that they support the movable member 30 in a particular orientation. The slot 32 is arranged to accommodate linear movement of the movable member 30 relative to the bogie beam 14. An actuator 36 is provided to move the movable member 30 and is connected to the movable member 30 at connection 38 and is connected at its second end by connection point 40 to a support arm 42 projecting from the bogie beam 12.

A rigid, elongate linkage 18 is pivotally connected to the axle 14 at pivot point 20. The linkage 18 includes the follower 22 which in this embodiment is a cam follower 22 arranged to follow a cam surface 34 of the movable member 30. The landing gear of this embodiment also includes a cam follower biasing device in the form of rollers 26 arranged to engage with a far side of the movable member 30 and being connected to the linkage 18 via a pair of extension springs 24, so as to bias the cam follower 22 against the cam surface 34. Other ways of providing a cam follower biasing device will be apparent to a skilled person, such as by way of hydraulic pressure.

Figure 2:
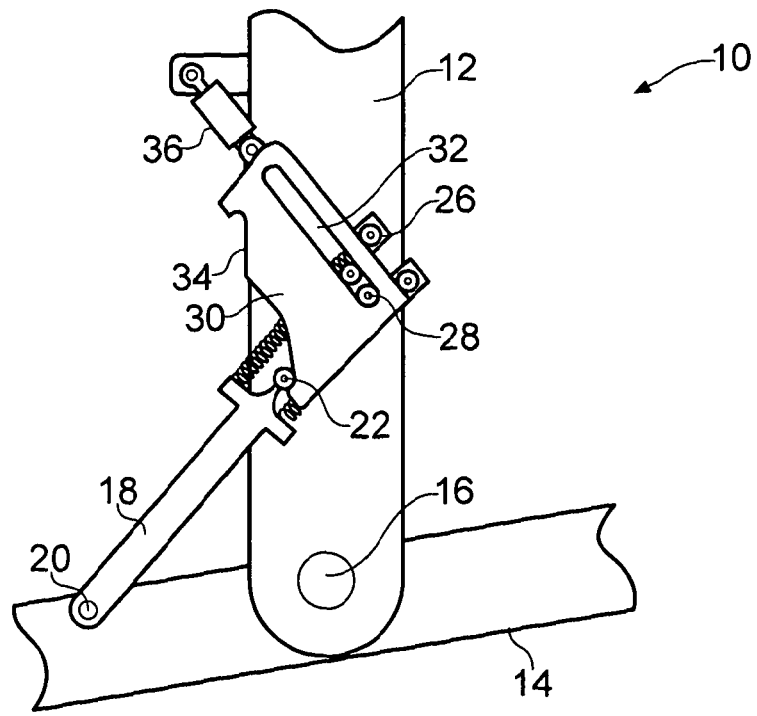
FIG. 2 shows a partial plan view of the landing gear of FIG. 1, however, with the movable member having moved so as to move the cam follower out of the locking region and into a non-locking region of the cam surface, this movement bringing about pivotal movement of the axle.

FIG. 2 shows the landing gear of FIG. 1 with the movable member 30 in a different position. The movable member 30 has moved linearly towards the actuator 36, due to shortening of the actuator 36. Consequently, the cam follower 22 has moved to a different part of the cam surface 34 and this in turn has changed the position of the linkage 18 which, due to it being pivotally connected to the axle 14 has caused the axle 14 to pivot relative to the bogie beam 12 about pivot point 16.

Thus, the locking device 11a has transferred a steering force to the axle 14 through the follower 22 by way of movement of the movable member 30. The support pins 28 have moved within the slot 32 relative to the movable member 30 to accommodate movement of the movable member 30. The rollers 26 have moved on the far side of the movable member 30 to stay in line with the cam follower 22. As will be appreciated, extension springs 24 are further extended due to the increased displacement between the cam follower 22 and the rollers 26.

Figure 3:
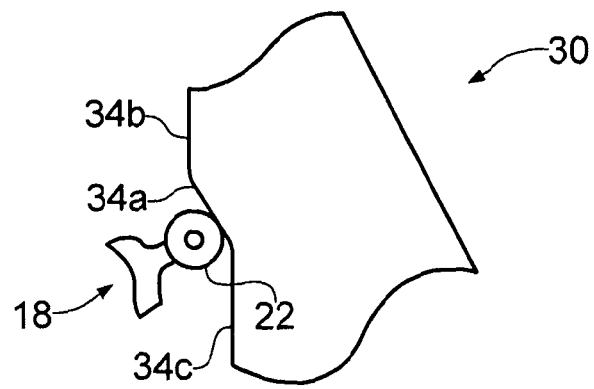
FIG. 3 shows a partial plan view of the movable member of FIG. 1.

FIG. 3 shows a partial plan view of the movable member 30 of FIG. 1. As can be seen, the cam surface 34 includes a locking region 34a which is configured such that the general plane defined by the surface of the locking region 34a is generally orthogonal with respect to the longitudinal axis of the linkage 18, when the axle 14 is at or close to its locking orientation. Consequently, when the cam follower 22 is at or within the locking region 34a of the cam surface 34, the linkage 18 and movable member 30 together act to prevent the axle 14 pivoting about the bogie beam 12 in response to a rotation force applied to it.

Referring back to FIG. 1 in combination with FIG. 3, a rotation force applied to the axle 14 attempting to cause the axle to pivot in a clockwise direction will be opposed by the linkage 18 acting in compression against the locking region 34a of the cam surface 34. The rotational force results in an axial force being applied to the movable member 30 through the linkage 18. Due to the fact that the general plane of the locking region 34a is generally orthogonal with respect to the longitudinal axis of the linkage 18, the force applied through the linkage 18 will be normal to the support plane defined by the locking region 34a. As such, there will be substantially no component of force acting parallel to the surface of the locking region 34a which could bring about movement of the cam follower 22 with respect to the cam surface 34. This results in the locking region 34a defining a "dead band" where a rotational force applied to the axle 14 results in substantially no movement of the movable member 60 and consequently no movement of the axle 14.

A rotational force applied to the axle 14 that would cause it to pivot in an anticlockwise direction is opposed, in this embodiment, by the cam follower biasing device 24, 26. In all embodiments where a cam follower biasing device is provided, it is desirable if it is configured to ensure that the cam follower substantially continuously remains in contact with the cam surface.

Extending from opposite sides of the locking region 34a are first and second non-locking regions 34b, 34c. The non-locking regions 34b, 34c are arranged to permit the axle 14 to pivot about the bogie beam when the cam follower 22 is at, i.e. within, one of the non-locking regions 34b, 34c. The non-locking regions 34b, 34c each have non-zero gradient with respect to the locking region 34a and in the illustrated example extend monotonically from either side of the locking region. Thus, then a rotational force is applied to the axle 14 while the cam follower 22 is within a non-locking region 34b, 34c, the force applied to the non-locking region 34b, 34c through the linkage 18 has an orthogonal component with respect to the axis of the linkage 18 and thus will cause the cam follower 22 to move along the non-locking region 34b, 34c of the cam surface 34. Equally, movement of the movable member 30 will bring about corresponding movement of the axle 14.

When viewing the cam surface 34b side on, as shown in FIG. 3, the non-locking region 34b extends away from the locking region 34a with a positive gradient, whereas the non-locking region 34c extends away from the locking region 34a with a negative gradient. Consequently, it is possible to rotate the axle 14 in either direction through movement of movable member 30.

Figure 4:
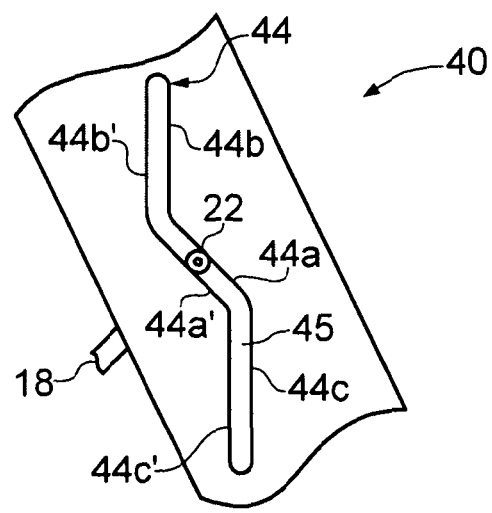
FIG. 4 shows a partial view of an alternative movable member where the cam surface is defined by a slot.

FIG. 4 shows a partial plan view of a movable member 40 according to an alternative embodiment of the present invention. The movable member is similar to movable member 30 and, for clarity, like parts will not be discussed in any detail. The cam surface 44 in this embodiment is defined by the walls of a slot 45 formed through the movable member 40. The slot 45 defines opposing locking regions 44a, 44a' as well as first opposing non-locking regions 44b, 44b' and second non-locking regions 44c, 44c'. In this embodiment, the cam follower 22 is located within the slot 45. The fact that the cam surface 44 is defined by a slot, within which the cam follower 22 is slidably engaged, removes any need for a cam follower biasing device.

Figure 5:
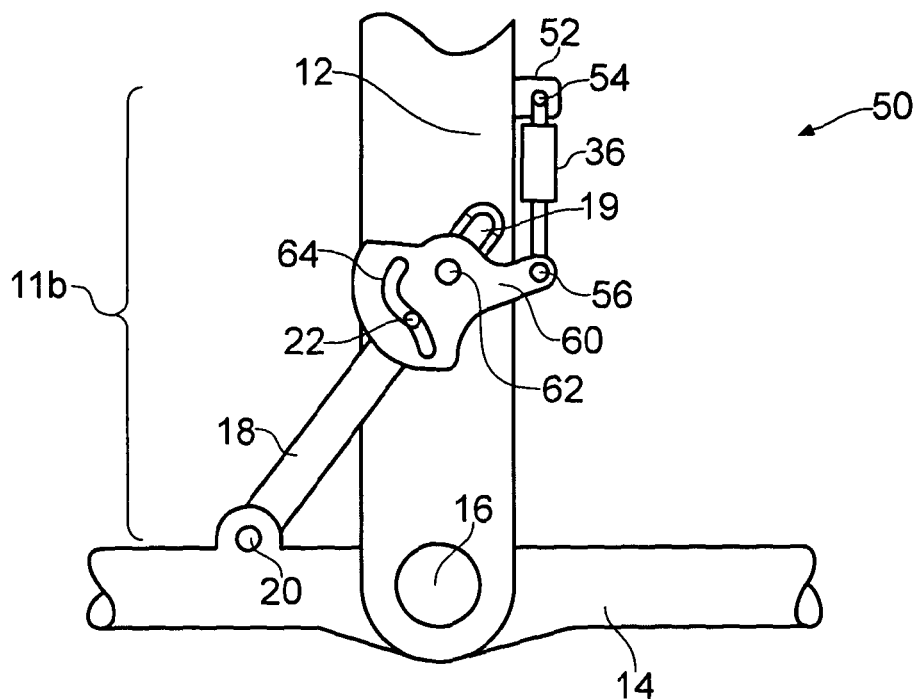
FIG. 5 shows a partial plan view of the landing gear according to an alternative embodiment of the present invention including a pivotally moveable movable member.

FIG. 5 shows a partial plan view of a landing gear 50 according to a further embodiment of the present invention. The landing gear 50 is similar to the landing gear 10 and, for clarity, like parts will not be discussed in any detail.

The locking device 11b of the illustrated landing gear 50 includes a movable member 60 that is pivotally connected to the bogie beam 12 via pin 62 and may thus pivot about it. The movable member 60 includes a slot defining the cam surface 64 in a similar fashion to that shown in FIG. 4. A person skilled in the art will appreciate however that the configuration of the slot varies slightly from that shown in FIG. 4 to account for the fact that the movable member 60 in the illustrated embodiment is configured to rotate, rather than being configured for linear movement as is the case with the movable member 40 shown in FIG. 4. The linkage 18 includes a cam follower 22 arranged to follow the cam surface 64 defined by the surfaces defining the slot.

The linkage 18 in the illustrated embodiment is slidably coupled to the bogie beam 12 via a pin 62 located within a slot 19 formed through the linkage 18. The slot 19 is configured to allow the axle 14 to move throughout its required degree of rotation. Although in the illustrated embodiment the linkage 18 is stabilised by means of a slot 19, other methods, such as a swinging link, may be used in alternative embodiments of the present invention.

The locking device 11b further comprises an actuator 36 having a first end pivotally connected to the movable member 60 via pivot point 56 and a second end connected to support arm 52 at pivot point 54. The support art 52 is rigidly connected to the bogie beam 14.

In use, the axle 14 of the landing gear 50 may be pivotally moved by actuator 36 extending or retracting. This in turn causes movable member 60 to pivot about pivot point 62, which in turn causes the cam surface 64 of the slot to move relative to the cam follower 22. Like in the earlier described embodiments, the cam surface 64 is arranged so as to have a locking region and two non-locking regions. The movable member 60 and linkage 18 are configured such that when the axle 14 is in the desired locking orientation, for example being generally orthogonal with respect to the longitudinal axis of the bogie beam 12, the linkage 18 is generally orthogonal to a general plane defined by the locking region of the cam surface 64 and thus within the "dead band". In the illustrated embodiment, the line of action of the linkage 18 passes through the axle attachment point 20, the cam follower 22 and the cam pivot 62.

When the actuator 36 extends beyond its normal centred configuration, the movable member 60 pivots clockwise about pivot point 62 which causes the axle 14 to pivot in an anticlockwise direction. Conversely, when the actuator 36 shortens, it causes the movable member 60 to rotate anticlockwise which causes the axle to rotate clockwise due to the cam follower following the configuration of the cam surface 64.

Figure 6:
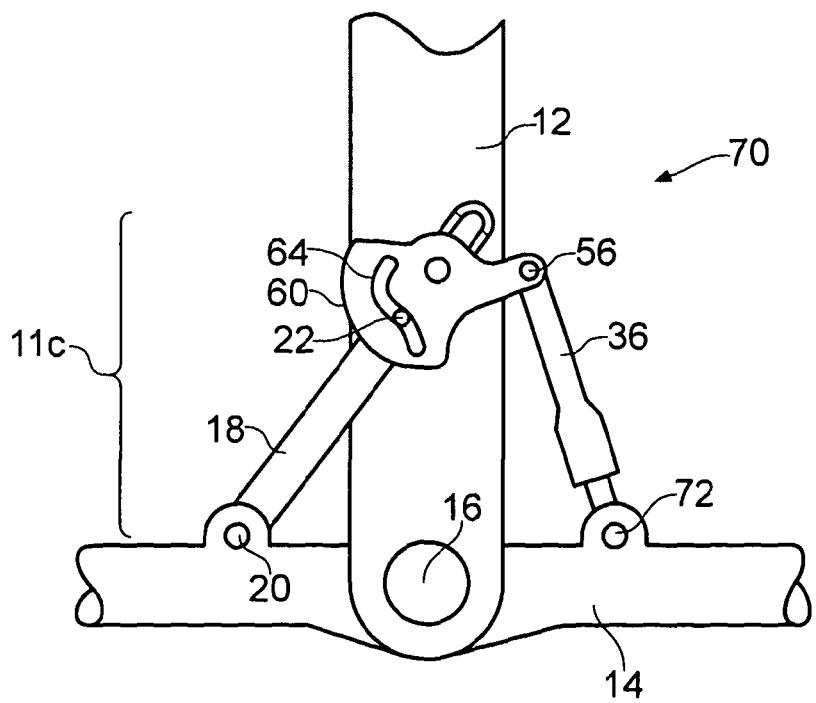
FIG. 6 shows a partial plan view of a landing gear according to a further embodiment of the present invention, including a pivotally mounted, movable member and an actuator connected to the axle.

FIG. 6 shows a partial plan view of a landing gear 70 according to a further embodiment of the present invention, including a locking device 11*c*. The landing gear 70 is similar to landing 50 except that in addition to being pivotally connected to the movable member 60 at pivot point 56, the actuator 36 of the locking device 11*c* has a second end pivotally connected to the axle at pivot point 72. As will be understood by a skilled person, this configuration provides a torque about the axle pivot 16 that is additional to the torque induced by movement of the linkage 18. Consequently, the actuator 36 requires more travel, but less load than the actuator 36 arrangement shown in FIG. 5 to bring about the same degree of movement of the axle 14.

Thus, the above-described embodiments of the invention provide a movable member 30, 40, 60 including a cam surface 34, 44, 64 including a locking region 34*a*, 44*a*, 44*a*' arranged such that when the cam follower 22 of the linkage 18 is within the locking region the axle 14 is locked against rotation. Consequently the mechanism is locked against external loads applied to the axle 14 when in this locking configuration.

In embodiments including an actuator 36 arranged to move the movable member 30, 40, 60, should it become desirable to lock the rear axle 14 in the desired locking orientation at a time when the axle 14 is not in the desired locking orientation, such as in the case where the trail effect is insufficient to move the axle to a desired orthogonal orientation with respect to the bogie beam 12, the movable member 30, 40, 60 can be moved by the actuator 36 to bring the axle into the locking orientation through movement of the cam follower 22 relative to the cam surface 34, 44, 64.

Whilst in the illustrated embodiments the linkage 18 is shown coupled to the axle 14 and the movable member 30, 40, 60 is shown coupled to or moveably mounted relative to the axle 12, in some embodiments these may be switched around such that the linkage 18 is coupled to the bogie beam 12 and the movable member 30, 40, 60 is coupled to or moveably mounted with respect to the axle 14.

Also, whilst the linkage has been described as being generally straight, it may, in other embodiments, be of different shape such as "L" shaped or the like. In such a case, reference above to the general plane of the locking region being generally orthogonal with respect to the longitudinal axis of the linkage should be substituted for the general plane of the locking region being generally orthogonal with respect to the axis defined by a straight line passing through both the cam follower and the point at which the linkage is pivotally connected to either the axle 14 or the bogie beam 12. Any suitable linkage arm may be provided.

Furthermore, in some embodiments of the present invention the cam surface may be embodied in different forms, such as wrapped around a shaft as a helix of varying pitch, including a region having zero pitch to act as the locking region.

Figure 7:
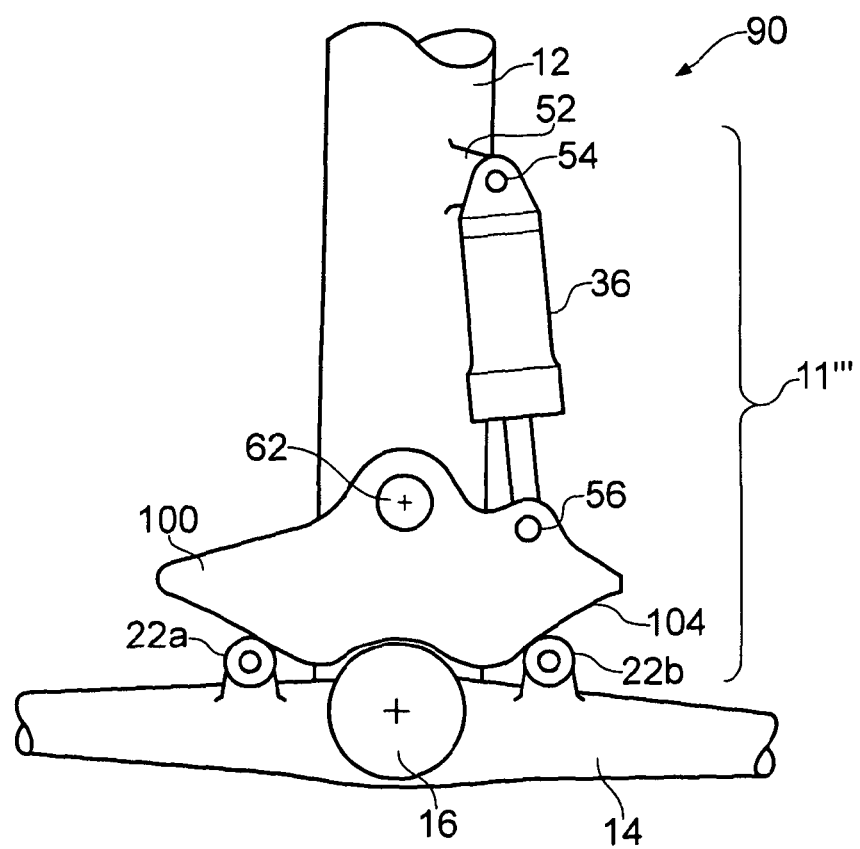
FIG. 7 shows a partial plan view of a landing gear according to a further embodiment of the present invention, including an alternative pivotally moveable movable member arranged to work with a pair of cam followers.
Figure 8:
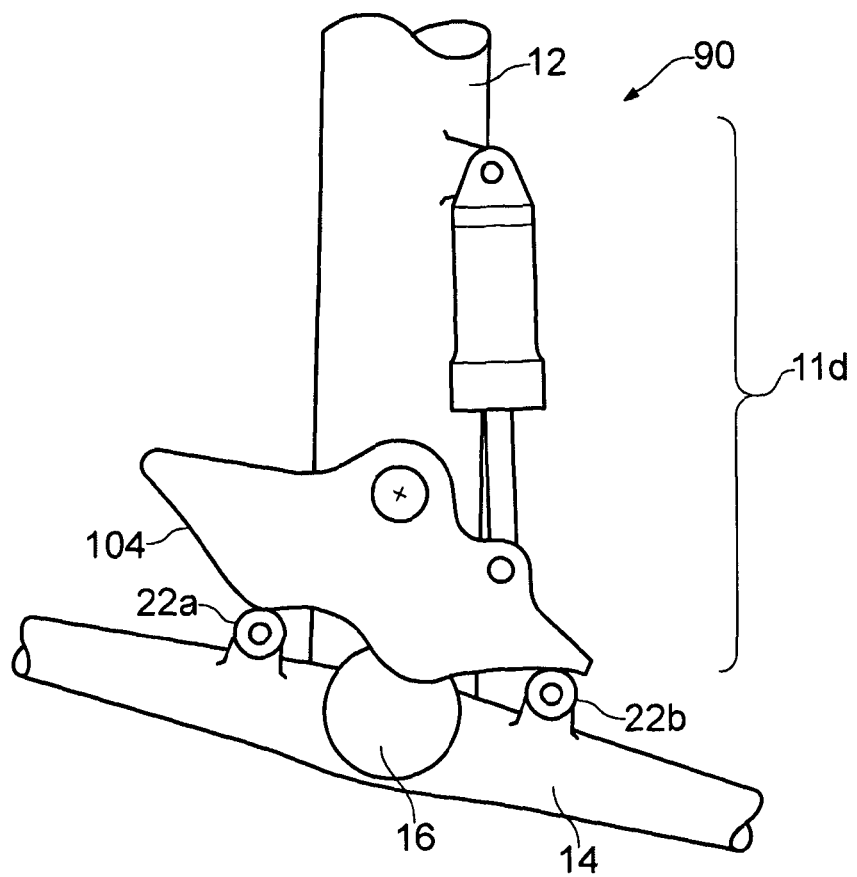
FIG. 8 shows a partial plan view of the landing gear FIG. 7, however, with the movable member having moved so as to move the cam followers out of the locking region and into a non-locking region of the cam surface, this movement bringing about pivotal movement of the axle.

FIGS. 7 and 8 show a partial plan view of a landing gear 90 according to a further embodiment of the present invention, including locking device 11*d*. The landing gear 90 is similar to landing gear 50 and similar parts have been given the same reference numerals. The locking device 11*d* of this embodiment includes a movable member 100 with a cam surface 104 defining a double cam profile, with a compression cam surface on either side of the bogie beam 12. The axle 14 carries a pair of cam followers 22*a*, 22*b*, disposed one either side of the axis or rotation 16 so that the axle rotation is constrained in both directions.

Figure 9:
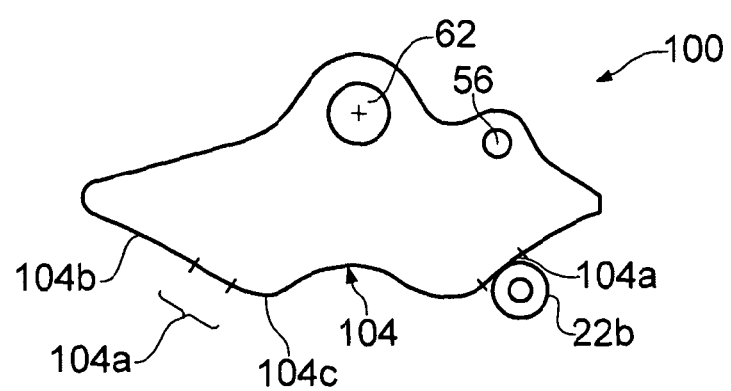
FIG. 9 shows the movable member of FIG. 7.

As illustrated in FIG. 9, the profile of the cam surface 104 is generally an inverted pair of rounded peaks, with a rounded trough between them. The pivot point 62 connecting it to the bogie beam 12 provided between and on the opposite side of the movable member 100 to the pair of peaks Each peak has an opposing face, which faces the other peak, and an outer face.

The locking device is arranged such that, with the axle 14 in an orthogonal orientation, the cam followers 22*a*, 22*b* engage with the outer faces of the peaks of the cam surface 104 at a locking regions 104*a* that are locally at constant radius from the cam pivot point 62, i.e. a circumferential surface, at right angles to the normal through the cam pivot centre. Thus, when a cam follower 22*a*, 22*b* is in the locking region, a line drawn through the axis of rotation of the cam follower 22*a*, 22*b* and the axis of rotation of the pivot point 62 is generally orthogonal to the cam surface of the locking region 104*a*. Consequently, when the locking device 11*d* is configured with the cam followers 22*a*, 22*b* in the locking region of the movable member 110, the axle 14 is locked against movement because, in this position, a force (moment) applied to the axle 14 will load one or other of the cam followers 22*a*, 22*b* but there will be no net moment on the movable member 100, and the locking device 11*d* will remain locked.

As with the embodiments described above, appropriate movement of the movable member 100 by the actuator 36 causes the movable member 100 to rotate and thus the cam surface 104 to move relative to the followers 22*a*, 22*b*, such that the followers 22*a*, 22*b* enter either of the non locking regions 104*b*, 104*c* and in doing so steer the axle 14. This is because the cam surface 104 of the movable member 100 is shaped so that when it rotates beyond a certain angle the followers 22*a*, 22*b* will no longer be on a constant radius surface, and will therefore apply a force to rotate the axle 14, see demonstrated in FIG. 8. On one side the cam radius from its pivot centre 62 will increase where the cam follower 22*a*, 22*b* contacts, while on the other it will decrease, with a relationship that matches the geometry of the axle 14 and cam followers 22*a*, 22*b*.

The above described embodiments of the present invention thus use movable member defining a cam surface to provide a 'dead band' position in which the axle 14 is incapable of back-driving the actuator 36, but within which the actuator 36 is capable of driving the axle 14 when so commanded. Outside the 'dead band' position the actuator 36 can drive the axle 14, but the axle 14 may also back-drive the actuator 36, for example, if the actuator is depressurised.

Figure 10:
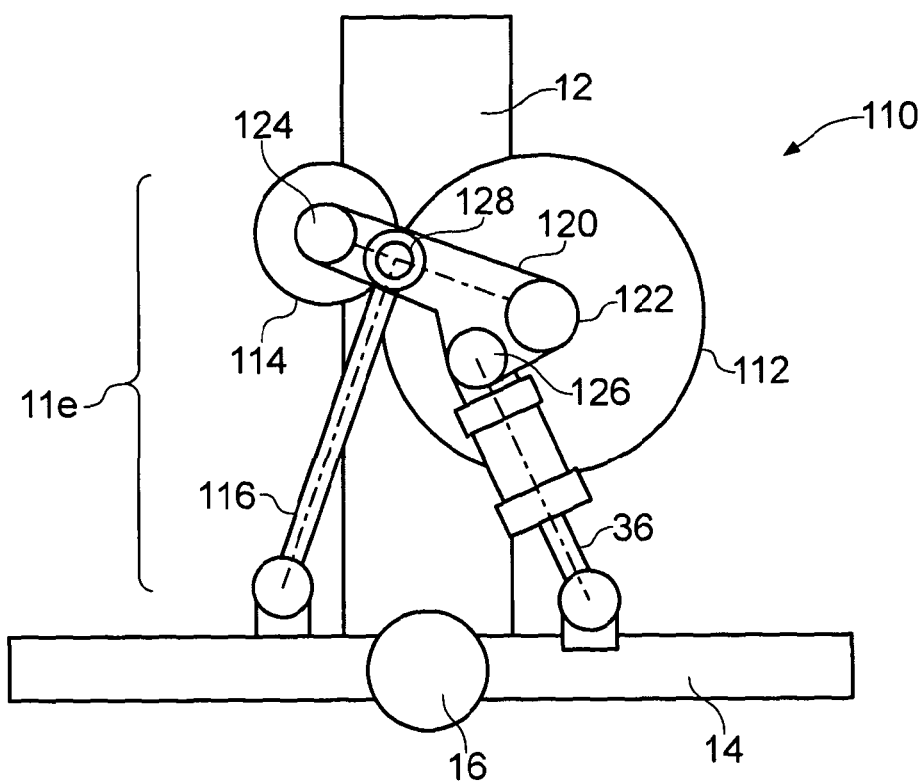
FIG. 10 shows a partial plan view of a landing gear according to a further embodiment of the present invention, including a locking device including an epicycloid gear arrangement shown in a locked configuration.
Figure 11:
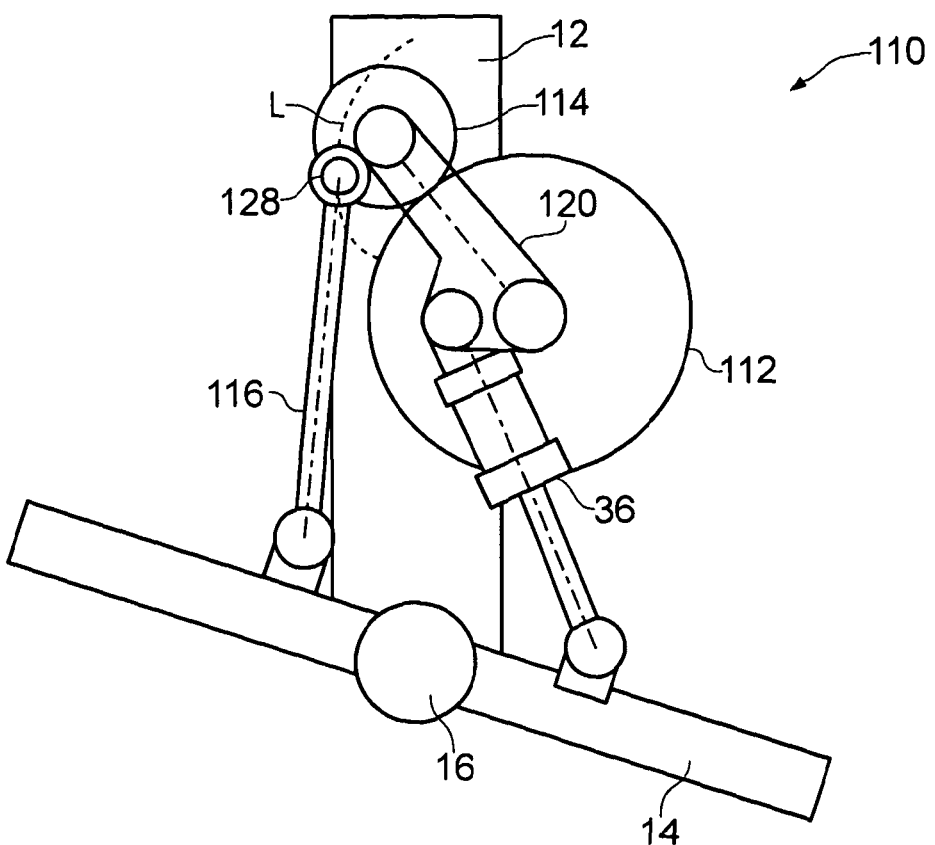
FIG. 11 shows a partial plan view of the landing gear FIG. 10, however, with the movable member having moved in a first direction so as to move the follower out of the locking region and into a non-locking region of the follower's locus, this movement bringing about pivotal movement of the axle in a first direction.
Figure 12:
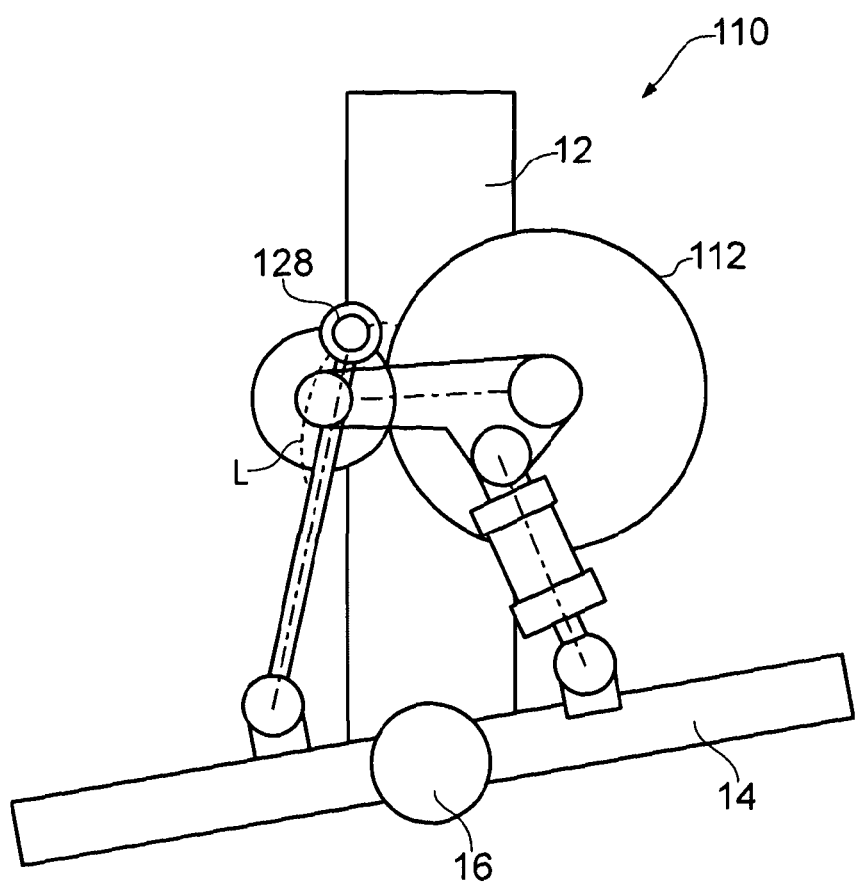
FIG. 12 shows a partial plan view of the landing gear FIG. 10, however, with the movable member having moved in a second direction so as to move the follower out of the locking region and into a non-locking region of the follower's locus, this movement bringing about pivotal movement of the axle in a second direction.

FIGS. 10 to 12 show a partial plan view of a landing gear 110 according to a further embodiment of the present invention, including a locking device 11*e*. The locking device 11*e* includes an epicycloid gear arrangement to provide the "dead band" and movable bands, in an analogous fashion to those described above.

The locking device 11*e* includes a gear wheel element 112 that is fixed relative to the bogie beam 14, with a movable member 120 pivoted about the geometric centre of the gear wheel 112. The movable member 120 is generally elongate and has three pivot points: a first pivot point 122 about the gear wheel 112 centre, a second pivot point 124 carrying a pinion gear 114, and a third pivot point 126 for attachment to an actuator 36.

The pinion gear 114 is free to rotate relative to its pivot 124 on the movable member 120, but is in mesh with the gear wheel 112. A pin 128 is fixed relative to the pinion gear 114, preferably at a point either similar, or slightly larger, radius from the pinion centre than the gear teeth mesh centre (pitch circle radius). The pin 128 thus defines a follower that moves in accordance with movement of the movable member 120. A link 116 connects the pin 128 to one side of the axle 14.

In the illustrated embodiment, a toothed gear wheel 112 and pinion 114 are shown as full-circumference gears, but in practice might be reduced to meshing arc elements i.e. just enough to cover the range of contact required.

When the actuator 36 is energised, as shown in FIG. 11, it causes the movable member 120 to swing relative to the gear wheel 112. The pinion gear 114, meshing with the gear wheel 112, will roll around its circumference, and the attached pin 128 will move through an epicyclic locus L, as illustrated. The attached link 116 will therefore cause the axle 14 to swing, thus providing steering.

As with embodiment described with reference to FIG. 6, the actuator 36 is shown attached to the axle 14 at its other end, both for convenience and in order to provide an increased mechanical advantage. However, the other end of the actuator 36 could be attached to, for example, the bogie beam 12, as shown in FIGS. 5 and 7.

FIG. 12 shows the locking device 11e with the axle 14 steered in the opposite direction. By considering the locus L of the pin, i.e. an epicycloid, it is apparent that in FIG. 10 it is at its closest point to the centre of the gear wheel 112, and its instantaneous path (moving off in either direction) is approximately normal to the gear wheel 112.

The link is positioned in FIG. 10 such that it is substantially normal to instantaneous path of the pin 128. This results in the locking device 11e being arranged such that the pin, which can also be thought of as a follower, 128 is positioned in a configuration whereby loads in the link 116 will not back-drive the movable member 120 of the locking device 11e, but that the actuator 36 can still power the movable member 120 from this position. At larger displacements the movable member 120 is capable of being back-driven.

Hence in embodiments of the present invention, the epicycloid mechanism is capable of performing the same function as the cam previously described.

In other embodiments the locking device 11e may include a movable member and follower arranged as part of a gear mechanism that causes the follower to move with another type of trochoidal locus. As will be understood by a skilled person, the term "trochoid" includes a cycloid (the locus of a pin 128 on the circumference of a pinion 114 moving along a linear path), an epicycloid (the locus of a pin 128 on the circumference of a pinion 114 moving around the outside of a circle) and a hypocycloid (the locus of a pin 128 on the circumference of a pinion 114 moving around the inside of a circle). Each of these loci are "common" trochoids, meaning that the pin 128 is located substantially on the circumference, or pitch circle radius, of the pinion 114.

In alternative embodiments, the distance of the pin 128 from the pinion 114 centre may be increased to a distance greater than the pitch circle radius, will produce a small 'loop' in the pin locus L and an improved range of locking region. This would define an extended cycloid, prolate epitrochoid or prolate hypotrochoid gear arrangement, depending upon whether the pinion 114 is arranged to move relative to a linear path, the outside of a circle, or the inside of a circle respectively. Each of these loci are "prolate" trochoids, meaning that the pin 128 is located beyond the circumference, or pitch circle radius, of the pinion 114.

In some embodiments the distance of the pin may be slightly less than the circumference, or pitch circle radius, of the pinion 114, resulting in a "curtate" trochoid that may lock under friction rather than locking geometrically.

It should be noted that the parts shown in the illustrated embodiment have, for clarity, not been obscured where they pass over one another. It will be apparent to a person skilled in the art that by spacing vertically, choosing gear and pinion sizes, using cantilever pin supports or curved links as appropriate, it will be possible to arrange the illustrated embodiment such that it is connected as described without fouls at extreme travel.

The landing gear 10, 50, 70 according to embodiments of the invention may further include a steering actuator (not shown) to steer the axle, with the actuator 36 being arranged to move the cam surface relative to the cam follower, to move the cam follower out of the locking region, so as to permit the steering actuator to change the orientation of the axle 14.

Whilst the cam follower 22 is in the non-locking region of the cam surface the actuator 36 may act passively, or may be energised to supplement the turning load applied to the axle 14.

Alternatively, all steering of the rear axle 14 may be provided through the movable member 30, 40, 60 and linkage 18.

In some embodiments of the present invention, the movable member 30, 40, 60, 100, 120 may be biased towards the position where the follower(s) 22, 22a, 22b is/are within the locking region, or dead band, by means of a movable member biasing device (not shown) such as a spring or the like. Due to the fact that the locking device 11a-e of the landing gear 10, 50, 70, 90, 110 according to embodiments of the invention does not cause surfaces to separate, operation of the locking device 11a-e may be quiet.

The invention claimed is:

1. A landing gear for an aircraft, the landing gear including an axle pivotally connected to a bogie beam and a locking device, the locking device being arranged to couple the axle to the bogie beam, the locking device including a movable member and a follower, the movable member being arranged to be moved by an actuator between first and second configurations, the locking device being arranged such that movement of the movable member from the first configuration to the second configuration causes corresponding movement of the follower so as to transfer a steering force to the axle, through the follower, which causes the axle to rotate in a first direction, wherein, with the movable member in the first configuration, the locking device is arranged with the follower in a locking configuration that inhibits the movable member being moved by an external force applied to the axle and, with the movable member in the second configuration, the locking device is arranged with the follower in a passive configuration that permits the movable member to be moved by an external force applied to the axle.

2. A landing gear according to claim 1, wherein the movable member is arranged to be moved to and from a third configuration, wherein, with the movable member in the third configuration, the locking device is arranged with the follower in a third configuration that permits the movable member to be moved by an external force applied to the axle.

3. A landing gear according to claim 2, wherein moving the movable member towards the third configuration causes corresponding movement of the follower so as to transfer a steering force to the axle through the follower which causes the axle to rotate in a second direction.

4. A landing gear according to claim 2 or 3, wherein the movable member enters the first configuration when passing between the second and third configurations.

5. A landing gear according to claim 1, wherein the movable member generally defines a support plane for supporting the follower and with the movable member in the first configuration, a force applied to the movable member through the follower, due to the external force applied to the axle, is generally normal with respect to the support plane defined by the movable member.

6. A landing gear according to claim 1, wherein the follower is connected to the axle via a linkage that is either rigidly or pivotally connected to the axle.

7. A landing gear according to claim 1, wherein the movable member is pivotally mounted with respect to the bogie beam.

8. A landing gear according to claim 1, wherein the movable member defines a cam surface and the locking device is arranged such that the follower is a cam follower that follows the cam surface in accordance with movement of the movable member.

9. A landing gear according to claim 8, wherein the cam surface is defined by a slot formed through the movable member, within which the cam follower is located.

10. A landing gear according to claim 1, wherein the movable member and follower are part of a gear arrangement arranged such that the locus of the follower follows a trochoid, cycloid, hypocycloid, epicycloid, hypotrochoid or epitrochoid path.

11. A landing gear according to claim 1, including an actuator arranged to move the movable member.

12. A landing gear according to claim 11, wherein the actuator is connected between the movable member and the axle.

13. A landing gear according to claim 1, further including a movable member biasing device arranged to bias the movable member towards the first configuration.

14. A landing gear according to claim 1, wherein with the moveable member in the first configuration, the movable member transfers the steering force to the axle, through the follower.

15. A landing gear for an aircraft, the landing gear including an axle pivotally connected to a bogie beam and locking means, the locking means being arranged to couple the axle to the bogie beam, the locking means including movable means and follower means, the movable means being arranged to be moved by actuator means between first and second configurations, the locking means being arranged such that movement of the movable means from the first configuration to the second configuration causes corresponding movement of the follower means so as to transfer a steering force to the axle, through the follower means, which causes the axle to rotate in a first direction, wherein, with the movable means in the first configuration, the locking means is arranged with the follower means in a locking configuration that inhibits the movable means being moved by an external force applied to the axle and, with the movable means in the second configuration, the locking means is arranged with the follower means in a passive configuration that permits the movable means to be moved by an external force applied to the axle.

16. A landing gear according to claim 15, wherein the movable means is arranged to be moved to and from a third configuration, wherein, with the movable means in the third configuration, the locking means is arranged with the follower means in a third configuration that permits the movable means to be moved by an external force applied to the axle.

17. A landing gear according to claim 15, wherein the movable means and follower means are part of a gear arrangement arranged such that a locus of the follower means follows a trochoid, cycloid, hypocycloid, epicycloid, hypotrochoid or epitrochoid path.

18. An aircraft landing gear steering system comprising:
a landing gear bogie beam;
a landing gear axle pivotally connected to the bogie beam;
a lock connecting the axle to the bogie beam, the lock comprising a movable member and a follower; and
an actuator configured to move the movable member between a first position and a second position;
wherein movement of the movable member from the first position to the second position applies a first steering force, through the follower and to the axle, to rotate the axle in a first direction; and
wherein, when the movable member is in the first position, the follower is positioned relative to the movable member such that an external force applied to the axle does not generate a substantial force to move the movable member and, when the movable member is in the second position, the follower is positioned relative to the movable member such that the external force applied to the axle generates a substantial force against the first steering force.

19. An aircraft landing gear steering system according to claim 18, wherein the movable member comprises a cam having a first portion that abuts the follower when the movable member is in the first position, and a second portion that abuts the follower when the movable member is in the second position, the first portion being parallel to an instantaneous direction of movement of the movable member when it the movable member is in the first position, and the second portion being non-parallel to an instantaneous direction of movement of the movable member when the movable member is in the second position.

20. An aircraft landing gear steering system according to claim 18, wherein follower is part of a gear arrangement, and the follower comprises a locus that follows a trochoid, cycloid, hypocycloid, epicycloid, hypotrochoid or epitrochoid path.

21. An aircraft landing gear steering system according to claim 18, wherein the actuator is connected between the movable member and the axle.

22. A landing gear for an aircraft, the landing gear including an axle pivotally connected to a bogie beam and a locking device, the locking device being arranged to couple the axle to the bogie beam, the locking device including a movable member and a follower, the movable member being arranged to be moved by an actuator between first and second configurations, the locking device being arranged such that movement of the movable member from the first configuration to the second configuration causes corresponding movement of the follower so as to transfer a steering force to the axle, through the follower, which causes the axle to rotate in a first direction, wherein, with the movable member in the first configuration, the locking device is arranged with the follower in a locking configuration that inhibits the movable member being moved by an external force applied to the axle so that the axle is positionally locked with respect to the bogie beam and, with the movable member in the second configuration, the locking device is arranged with the follower in a passive configuration that permits the movable member to be moved by an external force applied to the axle.

* * * * *